United States Patent
Wambugu et al.

(10) Patent No.: US 11,184,476 B2
(45) Date of Patent: Nov. 23, 2021

(54) PREVENTING PHOTO IMAGE RELATED RISKS

(71) Applicant: International Business Machines Corporation, Armonk, NY (US)

(72) Inventors: Isaac Waweru Wambugu, Nairobi (KE); Komminist Weldemariam, Ottawa (CA); Michael S. Gordon, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/589,782

(22) Filed: Oct. 1, 2019

(65) Prior Publication Data
US 2021/0099571 A1 Apr. 1, 2021

(51) Int. Cl.
*H04M 1/72463* (2021.01)
*G06K 9/00* (2006.01)
*H04N 5/232* (2006.01)
*H04W 4/21* (2018.01)
*H04W 4/021* (2018.01)
*H04M 1/72457* (2021.01)

(52) U.S. Cl.
CPC .... *H04M 1/72463* (2021.01); *G06K 9/00671* (2013.01); *H04M 1/72457* (2021.01); *H04N 5/23218* (2018.08); *H04W 4/021* (2013.01); *H04W 4/21* (2018.02); *H04M 2250/52* (2013.01)

(58) Field of Classification Search
CPC ......... H04M 1/72577; H04M 1/72572; H04M 2250/52; H04W 4/21; H04W 4/021; H04N 5/23218; G06K 9/00671
See application file for complete search history.

(56) References Cited

U.S. PATENT DOCUMENTS

| | | | |
|---|---|---|---|
| 10,043,376 B1 * | 8/2018 | Poornachandran .. | G08B 25/016 |
| 10,415,742 B2 | 9/2019 | Kundu et al. | |
| 2008/0248809 A1 | 10/2008 | Gower | |
| 2013/0340089 A1 * | 12/2013 | Steinberg ................ | H04L 51/12 726/27 |
| 2014/0032666 A1 * | 1/2014 | Chan ....................... | H04L 67/02 709/204 |
| 2014/0129627 A1 * | 5/2014 | Baldwin ................ | G06Q 10/10 709/204 |

(Continued)

OTHER PUBLICATIONS

Ore, J., "Researchers tracked 127 selfie-related deaths from 2014 to late 2016", CBC News, Posted: Nov. 19, 2016, Last Updated: Nov. 19, 2016, 7 pages https://www.cbc.ca/news/technology/research-selfie-deaths-1.3858271.

(Continued)

*Primary Examiner* — Jason A Flohre
(74) *Attorney, Agent, or Firm* — Scully, Scott, Murphy & Presser, P.C.; Shimon Benjamin

(57) ABSTRACT

An image file is to be posted on a social media web site is automatically detected, the image file containing at least an image of a first individual with a background image depicting a location determined to be unsafe. A risk level associated with the location is determined. Based on the risk level, an action is automatically activated, which prevents at least a second individual from taking a photograph of the second individual at the location.

20 Claims, 6 Drawing Sheets

(56) References Cited

U.S. PATENT DOCUMENTS

2016/0203639 A1* 7/2016 Bostick ............... G02B 27/017
                                                        345/619
2016/0381064 A1* 12/2016 Chan ..................... H04L 51/32
                                                         726/25
2018/0249069 A1* 8/2018 Rakshit ............. H04N 5/23206

OTHER PUBLICATIONS

BBC Newsbeat, "The rise in selfie deaths and how to stop them", LIFE, Nov. 17, 2016, 6 pages http://www.bbc.co.uk/newsbeat/article/38012990/the-rise-in-selfie-deaths-and-how-to-stop-them.

Bansal, A., et al., "Selfies: A boon or bane?", J Family Med Prim Care, Jul.-Aug. 2018, 10 pages, 1v.7(4) https://www.ncbi.nlm.nih.gov/pmc/articles/PMC6131996/.

ABC News, Lifestyle News, "Official: Man jumps to his death at Grand Canyon Skywalk", Sep. 29, 2019, 3 pages https://abcnews.go.com/Lifestyle/wireStory/fatal-falls-grand-canyon-follow-dozens-62385500.

Gearty, R., "Fordham University senior, 22, dies after she fell from campus bell tower", Fox News, pulbished Apr. 14, 2019, 4 pages https://www.foxnews.com/US/fordham-university-student-falls-climbing-campus-bell-tower-to-take-photos.

Romo, V., "Selfie-Taking Woman Apologizes After Jaguar Attack at Arizona Zoo", NPR, Animals, Mar. 11, 2019, 12 pages https://www.npr.org/2019/03/11/702386685/selfie-taking-woman-apologizes-after-jaguar-attack-at-arizona-zoo.

Lishivha, W., "10 of the most dangerous selfies snapped", Getaway, Oct. 4, 2018, 21 pages https://www.getaway.co.za/adventures/worlds-dangerous-selfies/.

Lamba, H., et al., "From Camera to Deathbed: Understanding Dangerous Selfies on Social Media", Proceedings of the Eleventh International AAAI Conference on Web and Social Media (ICWSM 2017), Last modified: May 3, 2017, pp. 576-579.

Google Play Store, "Saftie", updated Jun. 16, 2017, 5 pages https://play.google.com/store/apps/details?id=com.something.vedant.crowdsourcing&hl=en_US.

Kumar, V., "IIT-Ropar develops app to prevent selfie deaths", The Times of India, Nov. 10, 2018 2 pages https://timesofindia.indiatimes.com/city/chandigarh/application-to-prevent-selfie-deaths/articleshow/66563387.cms.

Fadelli, I., "Three convolutional neural network models for facial expression recognition in the wild", Tech Xplore, May 24, 2019, 4 pages https://techxplore.com/news/2019-05-convolutional-neural-network-facial-recognition.html.

* cited by examiner

PREVENTING PHOTO IMAGE RELATED RISKS

BACKGROUND

The present application relates generally to computers and computer applications, and more particularly to image analysis and social media web sites.

The introduction of tools or devices such as elongated sticks or wands that can hold a smartphone with a camera at a distance beyond the normal range of the arm has made self-taking photograph activities (e.g., using a front-facing camera on a smartphone device) very popular. Their ease of use, convenience, and compatibility with existing tools are the major factors for their popularity worldwide.

While the photographers may visually inspect the locations of photography when engaging in self-taking photograph activities, some locations may still pose a dangerous condition, e.g., too near a scenic but dangerous cliff, too near an exotic wild animal. Even so, once successfully taken, users tend to post the photographs on web sites such as a social media or network web sites, which may further encourage others viewing the photographs to do the same.

BRIEF SUMMARY

A computer system and a computer-implement method may be provided, which can prevent photo image and/or video related risks. The system, in one aspect, may include a hardware processor. A memory device may be coupled with the hardware processor. The hardware processor configured to detect automatically that an image file is to be posted on a social media web site, the image file containing at least an image of a first individual with a background image depicting a location determined to be unsafe. The hardware processor may also be configured to determine a risk level associated with the location. The hardware processor may also be configured to, based on the risk level, automatically activate an action that prevents at least a second individual from taking a photograph of the second individual at the location.

A computer-implemented method, in one aspect, may include detecting automatically that an image file is to be posted on a social media web site, the image file containing at least an image of a first individual with a background image depicting a location determined to be unsafe. The method may also include determining a risk level associated with the location. The method may further include, based on the risk level, automatically activating an action that prevents at least a second individual from taking a photograph of the second individual at the location.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
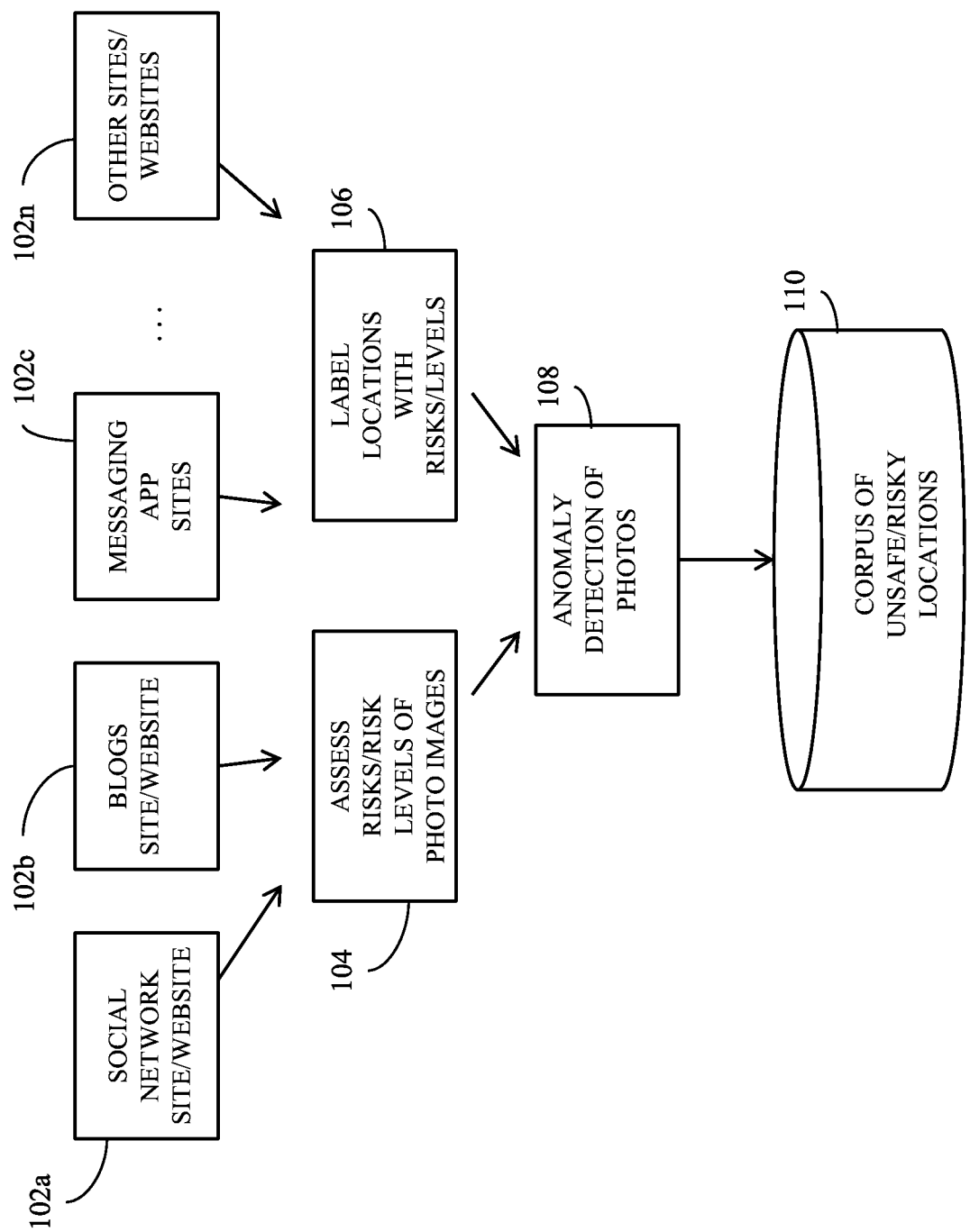
FIG. 1 is a diagram illustrating creating of a corpus of locations determined to be unsafe locations for self-portrait type photographs in one embodiment.

Images or image files of photographs or videos taken at different locations, areas, and environment can be posted on the Internet such as on the social media or networking websites, for instance, for sharing with others. A user, for example, can take a self-portrait type image (also referred to as a "selfie") with a smartphone which may be held in the hand or supported by a stick. In some cases, self-taken photographs appear casual in nature (or made to appear casual) and are shared on social networking services. Those photographs can include backgrounds that pique others' interests or curiosity, and can encourage or motivate others to experience the same or similar environment. While the description herein refers to self-taken images or photographs, the methodologies described herein can also apply to videos such as self-taken videos.

When taking a photograph of oneself, however, an individual may not fully assess the risks posed by the surrounding environment and location of where the photography is taking place. In another aspect, the degree of "safeness" of the locations can vary based on one or more views or angles a photographer is attempting to capture. An attempt to capture a particularly adventurous view at a location, for example, can create a potentially unsafe condition for the individual. Nonetheless, such photographs can get uploaded or posted on the Internet.

A system, method and technique may be presented, which may deter or prevent a second or additional individual from attempting to take a similar self-photograph at the same location or environment detected to be associated with an unsafe condition. In an aspect, the system is an intelligent system, which may automatically detect and predict potential unsafe conditions based on a first individual's self-photograph image, and which may automatically perform an action to prevent another individual from taking a risk at the location to create a self-portrait image with the similar subject or background.

In an embodiment, the system may selectively remove self-taken photographs from social media posts to prevent others from taking the same or similar photographs based on a risk assessment of anticipated photograph locations or subject matter. For example, the system may detect that a self-portrait type photograph is about to be posted, or posted and/or shared on one or more social media sites, assess risks (e.g., safety risk associated with taking a self-portrait type photograph) associated with a location or subject matter of the photograph, and based on the risk assessment, automatically trigger or activate an amelioration action to prevent others from taking self-portrait type photographs from the anticipated "unsafe" location. In an embodiment, the method may automatically detect that a portrait type photograph is about to be posted, based on analyzing a user event or sequence of events (e.g., a user "select"s an image from camera local storage and then "click"s a post/share button or icon) using a sequence mining machine learning technique wherein the selected portrait type photograph to be posted is also analyzed to determine its riskiness based on the location.

In embodiments, the system can act as an advisor app (application) or a tool for viewers of previously posted self-portrait type photographs based on analysis of historical self-portrait type photographs; act as a proactive preventive app or a tool for users predicted to take self-portrait type photographs at least in one predicted anticipated "unsafe" location; act as a real-time preventive app for users who are attempting to post self-portrait type photographs (or posting self-portrait type photographs) where the app may delete such photographs or restrict their viewing for self-use-only; act as a real-time advisory app for authorities (or parents) who can take proper amelioration action (e.g., prevent users from taking photographs of oneself at the anticipated "unsafe" location, e.g., at specific time-of-day).

FIG. 1 is a diagram illustrating creating of a corpus of locations determined to be unsafe locations for self-portrait type photographs in one embodiment. In an embodiment, based on historically posted self-portrait type photographs, the system may create a corpus of locations determined to be unsafe locations for self-portrait type photographs and data associated with possible pose positions which may be considered particularly unsafe and risky. The corpus can be saved or stored on a memory or storage device 110. In an embodiment, the system may implement a computer-implemented web crawler or a robot which automatically navigates to web sites such as social media or network web sites 102a, blog web sites 102b, messaging app sites 102c, and other sites 102n, and the like, to collect data associated with publicly available self-portrait type photograph image files. The collected data can include comments and sentiments associated with the image files. The system can analyze the data to determine the riskiness or the risk levels associated with the image files. The system can determine the degree to which a location is "unsafe" to one or more users or cohort of a user for taking the same or similar self-portrait type photographs.

For instance, a computer-implement component 104 can analyze and assess risks associated with the self-portrait type photograph image files, which are under analysis. Analyzing the data may include using keyword searches, pattern recognition, and natural language processing techniques to determine the semantics or meanings of the data. In an embodiment, data analysis can further include correlating available incident reports (e.g., from authorities) with the locations. The data analysis, for instance, can include determining reactions (e.g., facial expression analysis by training one or more convolutional neural network models) and/or interactions of viewers of the posted self-portrait type photographs and/or the cohorts of predicted viewers who would react to the posted self-portrait type photographs. In an embodiment, the reactions can be detected from comments posted on a social media site. In another embodiment verbal reactions could be recorded. In an embodiment, the risk levels at a location may dependent on time (time-of-day) and context (e.g., weather, season, crowd density in the anticipated location), and therefore, a database of corpus of unsafe locations may have time and context attributes associated with the risk levels. A computer-implemented component 106 may label the locations associated with self-portrait type photographs according the determined risk levels. The labels or attributes may include data structure with a plurality of fields or attribute/value pairs.

A computer-implemented component 108 may detect anomalies associated with the locations, for example, by comparing a risk level associated with a location to a predetermined threshold risk level. The component 108 may identify the locations with risk levels that exceed the predetermined threshold risk level to be anomalous, and may save those locations and associated risk levels and attributes in a database and store them on a storage device 110. In an embodiment, a particular view or angle of posing at a location, which may be detected as being unsafe, can also be saved as an attribute of the location. Such view or angle can be determined based on performing image analysis of photographed images and text or voice analysis of associated comments.

Figure 2:
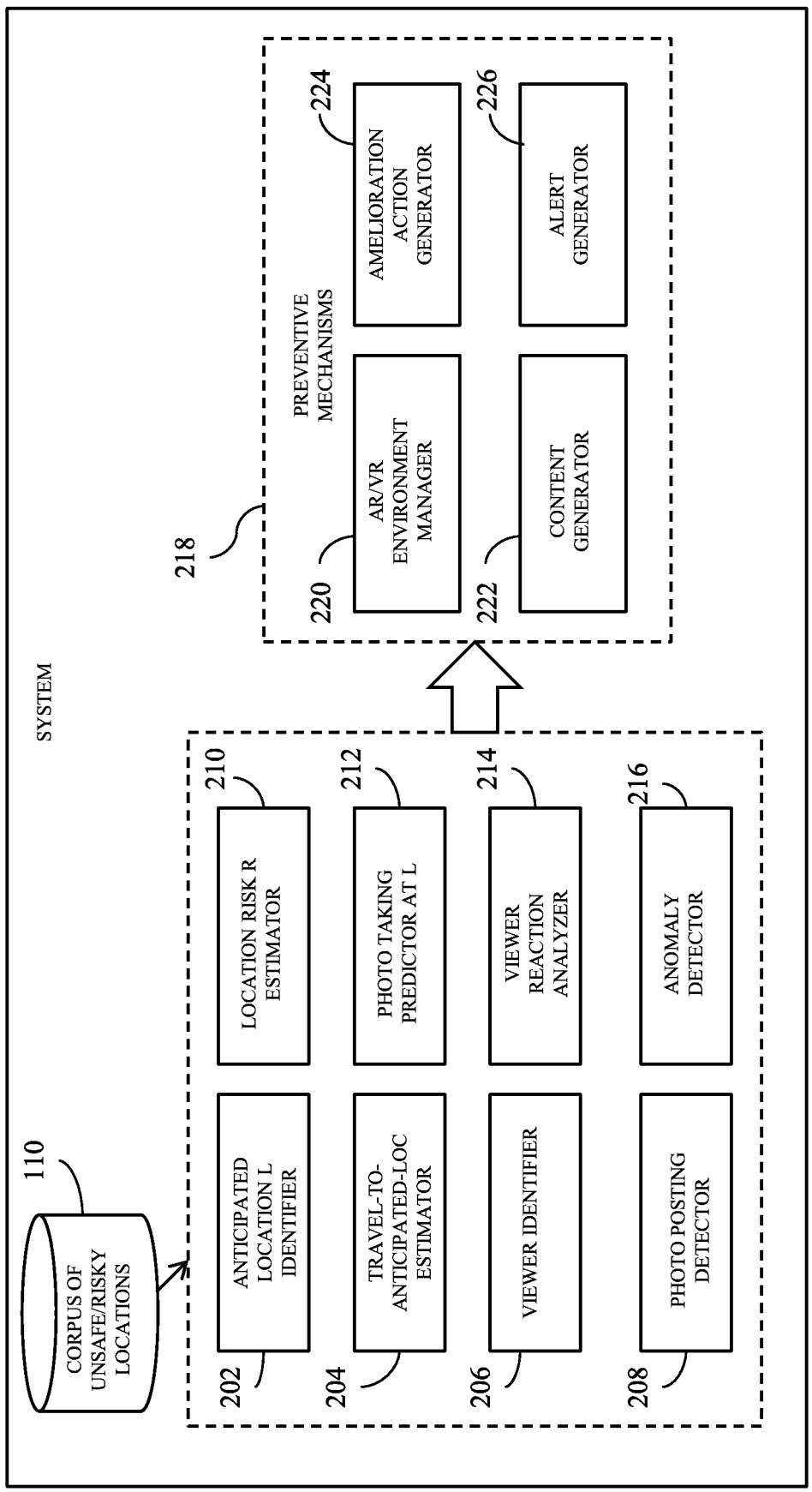
FIG. 2 is a diagram illustrating computer-implemented components or functions, which can execute on a computer processor, to implement a system and/or method disclosed herein in an embodiment.

FIG. 2 is a diagram illustrating computer-implemented components or functions, which can execute on a computer processor, to implement a system and/or method disclosed herein in an embodiment. For instance, the components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A location identifier 202 may retrieve one or more locations from a corpus of unsafe locations, for example, from a database 110. A travel-to-location estimator 204 may detect that an individual or group of people is traveling to an identified unsafe location. The individual may be a second individual who viewed a first individual's self-portrait type photograph taken (or simulated as if taken) at the identified unsafe location. A viewer identifier 206 identifies a viewer (also referred to as a second individual) who views or has viewed a first individual's self-portrait type photograph. A photo posting detector 208 detects an individual (referred to also as a first individual) posting a self-portrait type photograph on a social media or network site or website or another information sharing site or website.

A location risk estimator 210 estimates a risk level associated with a respective location, for example, based on analyzing data such as comments made about the location and incident reports associated with location. A photo taking predictor 212 detects whether an individual (referred to as a second individual) is taking a self-portrait type photograph at the location, for instance, despite a warning or an alert about the risk. A viewer reaction analyzer 214 analyzes viewer comments and determines viewer reactions and sentiments regarding a self-portrait type photograph at the location. The viewer reaction analyzer 214 may implement natural language processing techniques and image analysis techniques to determine viewer reactions and sentiments.

Anomaly detector 216 detects a location or locations with potential risk or risks for taking a self-portrait type photograph. For example, a risk level associated with a location can be compared with a threshold risk level, and if the risk level exceeds the threshold level, the location can be considered as an anomalous location or location considered to be unsafe for taking future self-portrait type photographs.

The system may also include one or more preventive mechanism components 218. Augmented reality (AR) and/or virtual reality (VR) environment manager 220 may generate augmented reality and/or virtual reality scenarios for presenting to a user (e.g., a second individual), for example, based on content generated by a content generator 222. The content generator 222 may generate educational material, which may aid in deterring or preventing a user (e.g., a second individual) from attempting to create or take a similar self-portrait type photograph at the location determined to be unsafe for such an activity. The educational material may include animations of possible dangerous conditions that can be created and/or other warning, for example, in textual and/or visual format. In another embodiment, the educational material can provide a written explanation for the risk and/or danger describing previous accidents and/or incidents at that location.

An amelioration action generator 224 may determine one or more amelioration actions, which may be activated to deter or prevent a user (e.g., a second individual) from attempting to take a self-portrait type photograph which may include unsafe situations. One or more amelioration actions may include generating and presenting or causing to present an AR/VR type of material, an alert and/or warning, and/or other educational material. An alert generator 226 may generate an alert, which can be sent to a user (e.g., a second individual).

In an embodiment, a first and a second individual can be the same individual. For instance, a second individual may be referring to the first individual attempting to repeat the similar photography taking action that the individual has taken before. In another embodiment, a first and a second individual are different individuals. For instance, a second individual may be referring to an individual who viewed and attempted to repeat a first individual's photography.

Another example of the amelioration action includes requesting that a self-portrait type photograph of the first individual be removed or deleted from a site or website. Yet another example may include automatically modifying the image or image file representing the self-portrait type photograph, for example, obfuscating the background that poses unsafe conditions. In that way, the location posing a safety risk may not be easily identified. Another example may include automatically removing of the image from a website's web page.

The location risk estimator 210 may also analyze reported danger levels of locations and infer particular views, angles and/or orientations of poses to be unsafe. The view reaction analyzer 214 may estimate crowd density of viewers on web sites (e.g., based on analyzing viewers' interactions and reactions). Based on the analysis, the system may request a user to remove self-portrait type photographs from online sites such as social media/network sites, blog sites, messaging app sites. If a user does not remove the item(s) (image of self-portrait type photograph(s)) associated with "unsafe" locations, the system may alert or transmit a message to one or more social media network providers or authorities to take preemptive actions such as requesting the removal of the photograph.

In an embodiment, the location risk estimator 210 may analyze individual or group danger levels associated with the anticipated location by using satellite imagery of the location, crowd sourced information, and/or other information.

In an embodiment, the location where the photograph is taken can be recorded automatically. For instance, locations can be identified using a location device such a Global Positioning System (GPS) device available on the device via which the photograph is taken, and such GPS coordinates can be recorded. The identified unsafe locations can be saved or stored in a database (e.g., 110 FIG. 1). Future self-portrait type photographs attempted to be taken at the same GPS location as previous photographs which were determined to be unsafe based on their location (and documented through their GPS coordinates) can be prevented from being taken and/or posted.

The view reaction analyzer 214 may determine a viewer's reaction, which for example, may include, but not limited to, amazed, surprised, excited, and/or another reaction, for example, recorded audio, from the viewer's comments and postings, and may infer that the viewer may attempt at taking the same or similar type of photograph at the location. In response, an amelioration action generator 224 may determine that an amelioration action that includes a virtual environment should be presented to the viewer and may automatically trigger the AR/VR environment manager 220 to generate AR/VR content, for example, via the content generator 222 and manage presentation of AR/VR to the viewer. AR/VR environment manager 220 may cause an AR/VR environment or any virtual environment to be presented on a viewer's computing device (e.g., smartphone, laptop, smart glasses, etc.) and guide or navigate the viewer through virtual environment to show the scenario and possible consequence if the user were to take a photograph from one or more views of the location.

In an embodiment, the content generator 222 may dynamically generate educational content and provide a different set of options to the user (viewer) based on the user's profile.

In one example, the content generator 222 may generate educational content that includes a published news article describing consequences of a user who has taken a self-portrait type photograph in a similar location and/or situation, for instance, too near a fence boundary at a zoo. In another example, the content generator 222 may generate educational content that includes a message that the user may be trespassing on unauthorized property or is in violation of a policy (e.g., no photograph taking allowed in a location).

In some example locations, a photograph can be taken safely, provided that a user keeps a safe distance from a potential hazard, such as staying behind a protective barrier. In such examples, the content generator 222 may generate educational content that includes a warning to step behind the protective barrier, or to not step over a boundary or fence, where a self-portrait type photograph can be taken more safely.

In an embodiment, the system may be configured with a social media network and run in the background, as a background process, to detect that a user is posting a photographic image that includes a self-portrait type photograph. The system can be triggered responsive to detecting that a user is about to post the photograph or based on one or more server-side rules. Such server-side rules can be predefined rules specified using properties of features such as location properties, time-of-day properties, photo properties, user properties, etc. The server-side rules may be specified using computer program readable formats such as in JavaScript Object Notation (JSON) and Extensible Markup Language (XML). An example of a rule is:

```
{rule_1: {
Location: {loc_name: "L1", loc_Danger_level: "High",
    angle: >65, direction: "right side", ...},
Time-of-Day: {start: 6pm, end: 8pm,
    predicted_weather_rain: 0.8", ...},
User: {selfie-stick: yes, ...}, ...,
photo_posting_probability: 0.7}
}
```

The photographs to be posted on the social media network or across social media networks are analyzed, for example, using a machine learning technique, for example, a trained image classifier to extract insights into the visual content by analyzing photographs, objects nearby, and other subjects. By analyzing, in real-time, the photograph and associated metadata, the system may identify the location and the location profile for each photograph or image, one or more photograph or image characteristics (e.g., positions, angles, views, time of day, season, etc.).

The system may use a combination of GPS (e.g., to determine the general location from where the photographic image is being posted or about to be posted, if the photo is being posted in real-time as it is taken or soon after it is taken near real-time), photograph image analysis to pinpoint the location, and also by cross-referencing with the unsafe location database in real-time. Consequently, the photographic image may be automatically deleted from the social media post (e.g., to deter or prevent others from taking the same or similar type of photograph from an "unsafe" location). As another example, the person posting may be warned about the unsafe location (e.g., to deter or prevent that person from taking another self-portrait type photograph at the same or similar location). As another example, appropriate authorities (e.g., law enforcement authority) may be alerted automatically, for example, a signal sent automatically, responsive to detecting a self-portrait type photograph taken at an unsafe location being posted on a social media site.

In an embodiment, responsive to detecting (e.g., by a social network server configured with a system or by the system) the self-portrait type photograph-taking user or group of users decide to share the photographs via online or offline mechanisms, the system (e.g., via the social network server on which the photographs are posted), may automatically execute an instruction to morph, modify, and/or obfuscate the identification of the "unsafe" location prior to sharing any of the photographs. As an example, the background can be blurred so that the location of an individual taking a self-photograph on a rocky cliff in a dangerous angle could not be identified.

Figure 3:
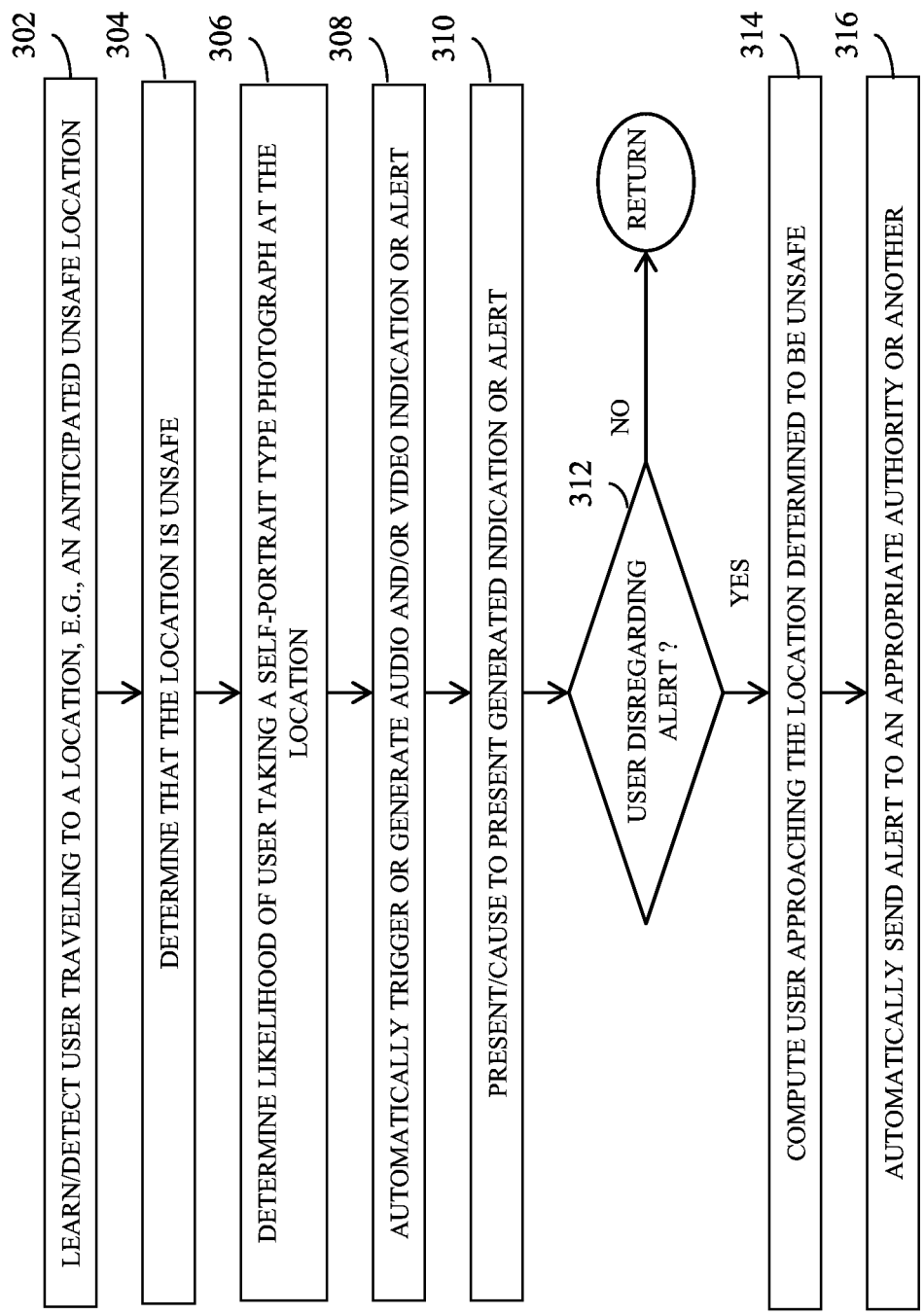
FIG. 3 is a flow diagram illustrating a method in an embodiment.

FIG. 3 is a flow diagram illustrating a method in one embodiment. The method may be executed by a computer-implemented component executing on a hardware processor or circuitry. At 302, the method includes learning or detecting a user or group of users traveling to a location, e.g., an anticipated unsafe location. The learning or detecting can be performed, for example, by inspecting electronic calendars, which may log planned time and location of a user, from social media posts, and from activity data such as GPS data from a user device or vehicle. A user or group may carry one or more devices (e.g., elongated or expandable stick or like device that can hold a camera or camera device (also referred to as "selfie-stick"), smartphones, camera, etc.) during their trip.

At 304, the method includes determining that the location is an anticipated unsafe location, for example, by comparing to a corpus of unsafe location stored in a database. The method may also determine that the location at a specific time of the day, season or specific weather condition, can be considered particularly unsafe. For example, there may be a level of riskiness for different times of the day for a location, which may be determined and logged.

At 306, the method includes determining that a user would take a self-portrait type photograph at the anticipated unsafe location, for instance, during the period including the specific time of the day, season or specific weather condition, determined to be particularly unsafe. For example, the probability of the user or group of users taking such photographs may be estimated by correlating with the user properties such as traveling (to an anticipated location) and travel items (e.g., camera and associated devices, social media posts). The system may detect these properties by analyzing the user electronic calendar, and historical carried items, wherein the detected anticipated location is compared with locations from the anticipated unsafe location database. Data can be retrieved associated with user properties in an opt-in or opt-out basis, with the permission of the user.

If the probability of taking a self-portrait type photograph at the anticipated unsafe location is above a predetermined threshold, the method may include switching to a "proactive preventive" mode. For example, at 308, in a "proactive preventive" mode, the method may include automatically triggering or generating an audio and/or video indication or alert.

An example of an audio and/or video indication may include an AR/VR environment or any virtual environment. The method, for instance, can include generating an AR/VR environment and causing the environment to be presented on a user computing device (e.g., smartphone, elongated camera stick, smart glass, etc.) and navigating the user through the virtual environment to show the possible consequences if the user or group would attempt to take a photograph (e.g., self-portrait type photograph of oneself). One or more angles, views, directions, rotations at the anticipated unsafe location can be assessed to determine the degree of riskiness, which can be simulated in the AR/VR environment. The method may also include generating educational content and displaying or presenting the educational content on a user device and/or via the AR/VR environment. At 310, for instance, the method may include presenting or causing to present (e.g., display) the generated indication or alert.

As another example, if the degree of risk or the risk level is deemed to be high (e.g., above a predefined threshold value), the method may include causing the device with which the user would take a photograph to become inactive. As yet another example, the method may include activating or causing the activation of a type of visual (e.g., light flashing, different shade of light, etc.), tactile (e.g., vibration, etc.), text, and/or audio (e.g., alarm sound, etc.) notification on a user device such as (but not limited to) elongated camera stick, camera, smartphone, etc. to indicate an elevated risk at that location. Similarly, an indication that the location is safe can be transmitted. For example, a green light can be triggered or activated to indicate that the location is safe.

At 312, the method may include determining whether the user is disregarding or rejecting the indication of the warning. By way of example, the user disregarding or rejecting the advice can be detected based on one or more events, for example, when the user rejects or cancels (e.g., touched a reject or cancel button or another user interface graphical element) one or more notifications or alerts sent to the user or the user device received, when the system or processor implementing the method does not receive any interaction event (e.g., cancel or reject event) in response to the one or more notifications or alert within a given time or predefined interval of time (e.g., predefined threshold), when the system detects a spoken keyword (e.g., "ignore the warning message"), and so on. If so, at 314, the method may include computing the user or group of users approaching the location determined to be unsafe. For instance, a distance formula can be used between two points A and B, e.g., Cartesian coordinates A(x1,y1) and B(x2,y2). A user approaching the location can be determined by computing the following factors: distance (distance between current location of the user or group of users and the anticipated location (e.g., based on global positioning system (GPS) information)), rate (the rate at which the user or group is traveling to the anticipated location, e.g., based on GPS location) and time (a measure of how long a user or group travel). At 316, as an example, the method may include, for instance, if it is determined that the risk level is high (e.g., above a predefined threshold value), sending an alert automatically to an appropriate authority or another person such as a guardian.

In an embodiment, the system may also detect an anomaly or a false sense of risk associated with a self-portrait type of photograph. For instance, a photograph may have background that is simulated to look as though it had been taken in a dangerous location. Such photographs are considered only a manipulation of reality and therefore not considered risky by the system. In an embodiment, the system may use such photographs to generate educational content and cause to present (e.g., cause to display) or present (e.g., display) on one or more viewer devices or AR/VR environment while explaining to viewers not to repeat taking such photograph in real-world scenario with identical or similar background.

For instance, some photographs may present a false sense of risk but in reality a product of a graphical manipulation, e.g., a 3-dimensional manipulation and camera positioning. In an embodiment, to detect this anomaly in a photograph deemed as being risky, the system can use the location information extracted from the metadata associated with the photograph to detect whether such a structure exists in the provided geographical location.

In an embodiment, a machine learning model such as a neural network model (e.g., convolutional neural network (CNN) model) can be trained to detect or classify a photograph between one having a simulated background scene and one with a non-simulated real background scene. For example, a subset scanning technique can be used, which can search over frames and pixels to calculate the measure of anomalousness while maximizing the measure of anomalousness over all the subsets (e.g., pixels). An example process may involve using a trained neural network. The neural network can be trained on natural occurring pictures which usually have very distinct features such a large amount of noise and smooth pixel distribution. Using the neutral network, the methodology in an embodiment can then detect any anomaly such as a picture which has been modified or digitally altered (photoshop) since the neural network activation sequence will highlight on the pixels that do not conform to the trained model. The methodology in an embodiment can then calculate the distribution of these activated pixels and determine if the image is an anomaly or not using p-values. Subset scanning methods treat the detection problem as a search for the most anomalous subset (i.e., highest scoring subset according to nonparametric scan statistics of node activations x network inputs.

In this way, the machine learning model can detect multivariant patterns. By running the machine learning model, a photograph which has an associated risky probability can undergo a subset scan, which generates an anomaly index associated with the photograph. The anomaly index can determine whether the photograph is deemed safe for upload or sharing. By way of example, consider an example of two self-taken images: a dangerous image that has been taken in a natural setting and an image that has been modified to add a sense of danger to the image. A neural network is able to detect the presence of adverse noise that has been added to the inputs. The image that has an added sense of danger will have qualities such as reduced quantity of natural occurring noise, sharp pixel edges, uneven distribution of pixel hue, saturation and brightness. Such qualities cause the neural network to activate when the modified image is passed through the model.

Using the p-values, the methodology in an embodiment can obtain the general probability (anomaly index) of the amount of modification that occurred in the image. If the modification is below a specific set percentage referred to as a threshold, the image can be termed as mostly natural occurring and can be deemed as a dangerous image. However, if the image has a high probability above the threshold, then it may be deemed safe since it is mostly a modified image.

Figure 4:
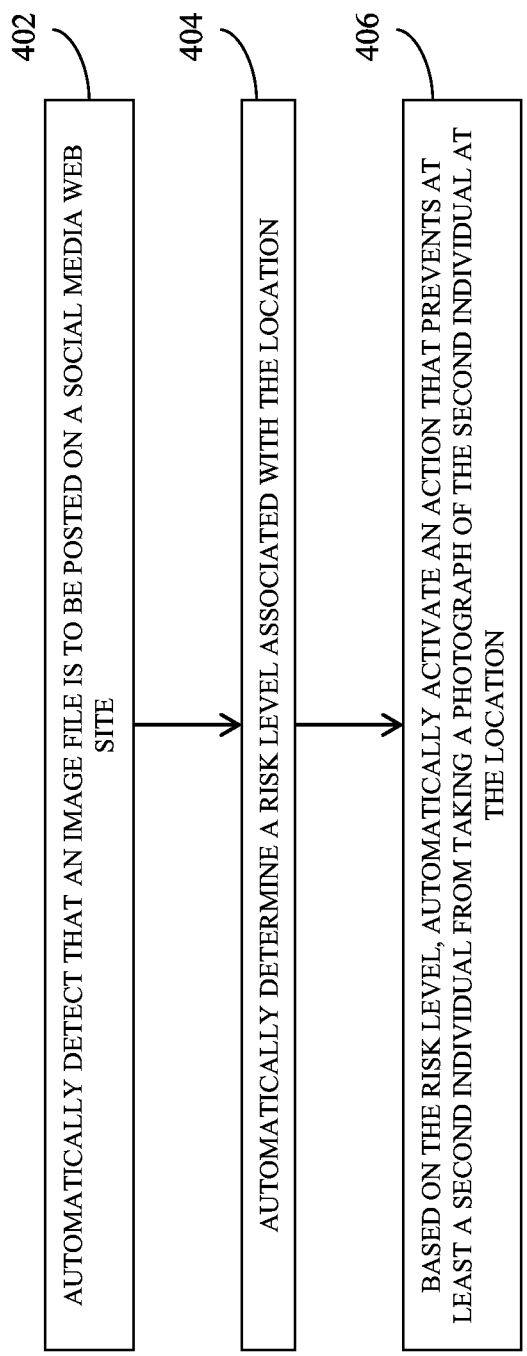
FIG. 4 is another flow diagram illustrating a method in an embodiment.

FIG. 4 is a flow diagram illustrating a method in an embodiment. The method can be performed by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

At 402, a hardware processor may automatically detect that an image file is to be posted on a social media web site. For example, the image file includes at least an image of a first individual with a background image, for example, a scene, depicting a location determined to be unsafe.

At 404, the hardware processor may automatically determine a risk level associated with the location. The risk level, for example, can be determined based on at least one of satellite imagery, crowd sourced data, and social media posts associated with the location.

At 406, based on the risk level, the hardware processor may automatically activate an action that prevents at least a second individual from taking a photograph of the second individual at the location. In an example, the action can include at least preventing the image file to be shared on the social media web site. In another example, the action can include at least removing the image file posted on the social media web site. In yet another example, the action can include at least modifying the background image to obfuscate identification associated with the location prior to the image file being shared on the social media website. Any one or more actions can be performed or activated concurrently.

In an embodiment, the hardware processor may further predict that the second individual is traveling to the location and likely to take a self-photograph at the location. Based on the prediction that the second individual is traveling to the location and likely to take a self-photograph at the location, the hardware processor may trigger an alert to be sent to a user device associated with the second individual. In an example, the action can include at least generating augmented reality of the second individual taking a self-photograph at the location in a virtual environment and causing the generated augmented reality to be presented to the second individual. In an example, the action can include at least deactivating a camera on a user device of the second individual based on determining that a likelihood of the second individual taking the self-photograph at the location exceeds a predetermined threshold. The predetermined threshold can be configured, or given a default value. Any one or more actions can be performed or activated concurrently.

Figure 5:
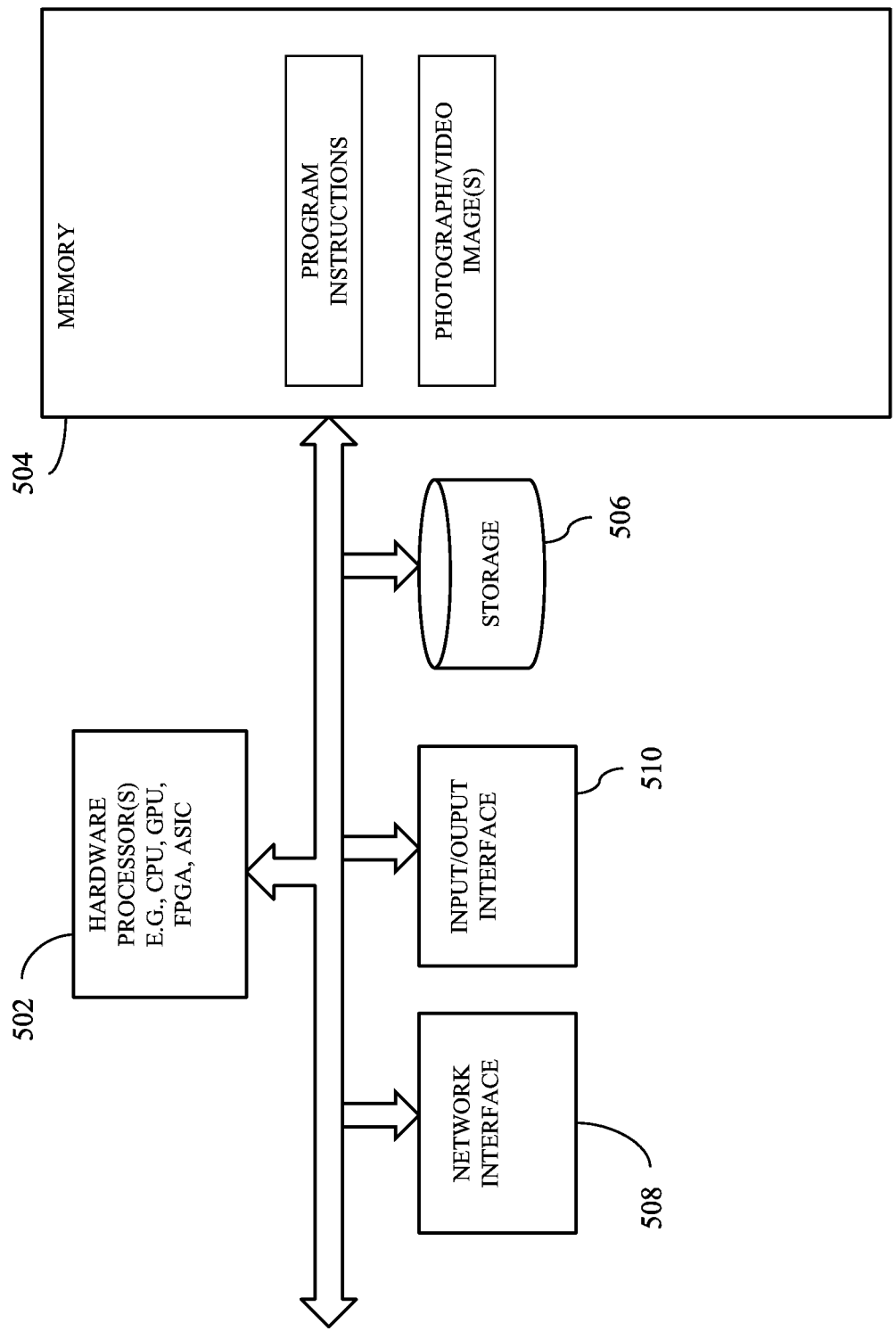
FIG. 5 is a diagram showing components of a system in an embodiment, which can automatically and selectively remove photographs from social media posts to prevent others from taking same or similar photographs based on risk assessment of locations from where the photographs are taken.

FIG. 5 is a diagram showing components of a system in one embodiment, which can automatically and selectively remove photographs from social media posts to prevent others from taking same or similar photographs based on risk assessment of locations from where the photographs are taken. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and detect automatically that an image file is to be posted on a social media web site, for example, an image file that contains at least an image of a first individual with a background image depicting a location determined to be unsafe. The location can be determined unsafe, for instance, by comparing the location in the photograph image to a database of unsafe location. One or more hardware processors 502 may also determine a risk level associated with the location. Based on the risk level, one or more hardware processors 502 may automatically activate an action that prevents at least a second individual from taking a photograph of the second individual at the location. A memory device 504 may include random access memory (RAM), read-only memory (ROM) or another memory device, and may store data and/or processor instructions for implementing various functionalities associated with the methods and/or systems described herein. One or more processors 502 may execute computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may receive input data such as an image to be loaded onto a web site, which can be analyzed to determine associated geographical location where the image is taken. For instance, at least one hardware processor 502 may compare the location to a database of unsafe location. In an embodiment, a corpus of unsafe locations may be stored in a storage device 506 or received via a network interface 508 from a remote device, and may be temporarily loaded into a memory device 504 for comparison. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Figure 6:
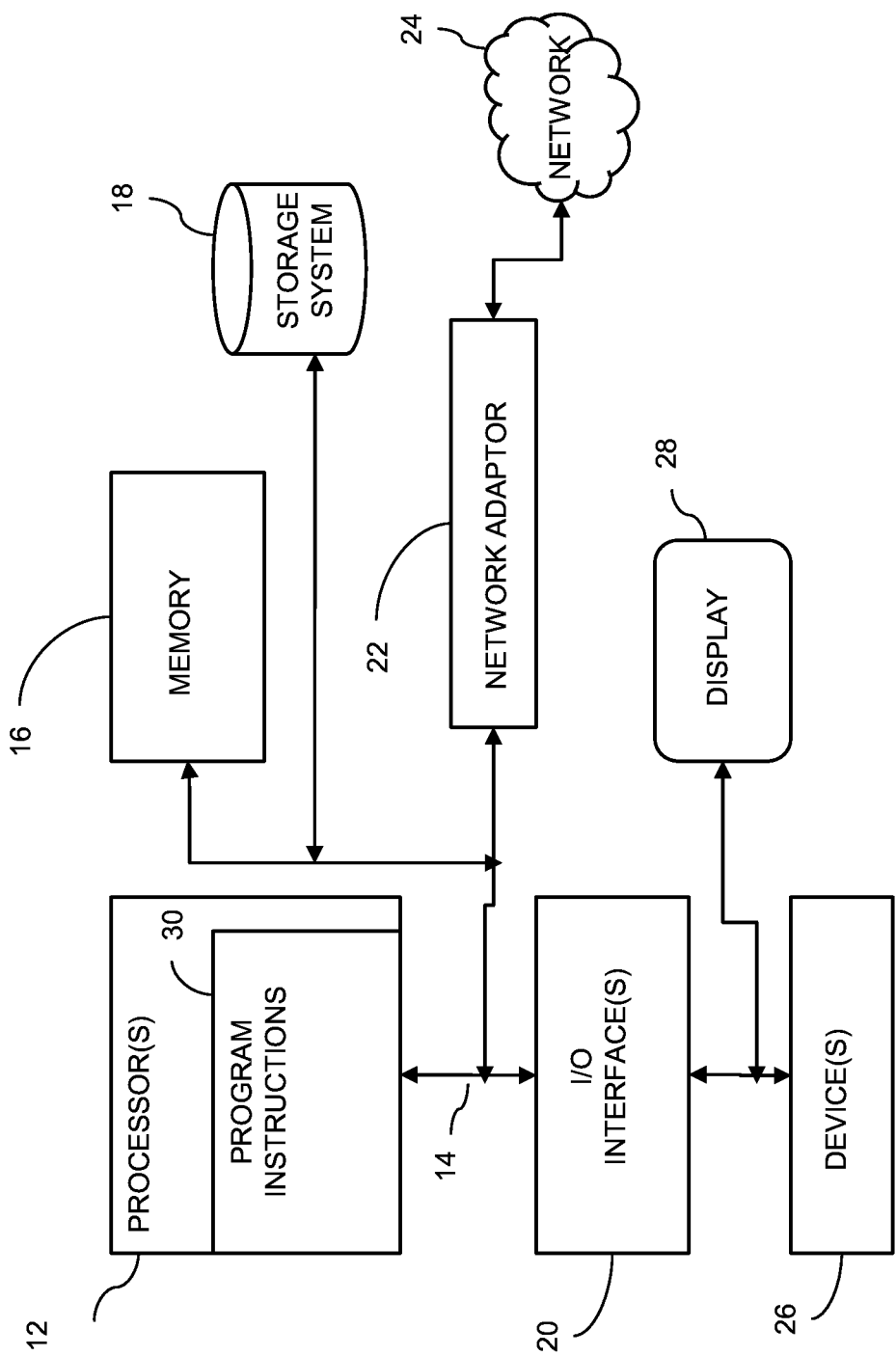
FIG. 6 illustrates a schematic of an example computer or processing system that may implement a system according to an embodiment.

FIG. 6 illustrates a schematic of an example computer or processing system that may implement A system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system comprising:
a hardware processor;
a memory device coupled with the hardware processor;
the hardware processor configured to at least:
detect automatically that an image file is to be posted on a social media web site, the image file containing at least an image of a first individual with a background image depicting a location determined to be unsafe;
determine a risk level associated with the location in the image file containing the image of the first individual with the location's background, wherein the risk level is determined at least based on detecting whether a false sense of risk is created in the image file by simulating the background;
based on the risk level, automatically activate an action to deter at least a second individual from taking a photograph of the second individual at the location.

2. The system of claim 1, wherein the action includes at least preventing the image file to be shared on the social media web site.

3. The system of claim 1, wherein the action includes removing the image file posted on the social media web site.

4. The system of claim 1, wherein the hardware processor is further configured to determine the risk level associated with the location based on at least one of satellite imagery, crowd sourced data, and social media posts associated with the location.

5. The system of claim 1, the hardware is further configured to predict that the second individual is traveling to the location and likely to take a self-photograph at the location.

6. The system of claim 5, wherein the hardware processor is further configured to, based on the prediction that the second individual is traveling to the location and likely to take a self-photograph at the location, trigger of an alert to be sent to a user device associated with the second individual.

7. The system of claim 1, wherein the action includes at least generating augmented reality of the second individual taking a self-photograph at the location in a virtual environment and causing the generated augmented reality to be presented to the second individual.

8. The system of claim 1, wherein the action includes at least deactivating a camera on a user device of the second individual based on determining that a likelihood of the second individual taking the self-photograph at the location exceeds a predetermined threshold.

9. The system of claim 1, wherein the action includes at least modifying the background image to obfuscate identification associated with the location prior to the image file being shared on the social media website.

10. The system of claim 1, wherein said taking a photograph includes taking a video.

11. A computer program product comprising a computer readable storage medium having program instructions embodied therewith, the program instructions executable by a device to cause the device to:
detect automatically that an image file is to be posted on a social media web site, the image file containing at least an image of a first individual with a background image depicting a location determined to be unsafe;
determine a risk level associated with the location in the image file containing the image of the first individual with the location's background, wherein the risk level is determined at least based on detecting whether a false sense of risk is created in the image file by simulating the background; and
based on the risk level, automatically activate an action to deter at least a second individual from taking a photograph of the second individual at the location.

12. The computer program product of claim 11, wherein the action includes at least preventing the image file to be shared on the social media web site.

13. The computer program product of claim 11, wherein the action includes removing the image file posted on the social media web site.

14. The computer program product of claim 11, wherein the device is further caused to determine the risk level associated with the location based on at least one of satellite imagery, crowd sourced data, and social media posts associated with the location.

15. The computer program product of claim 11, the device is further caused to predict that the second individual is traveling to the location and likely to take a self-photograph at the location.

16. The computer program product of claim 15, wherein based on the prediction that the second individual is traveling to the location and likely to take a self-photograph at the location, the device is further caused to trigger an alert to be sent to a user device associated with the second individual.

17. The computer program product of claim 11, wherein the action includes at least generating augmented reality of the second individual taking a self-photograph at the location in a virtual environment and causing the generated augmented reality to be presented to the second individual.

18. The computer program product of claim 11, wherein the action includes at least deactivating a camera on a user device of the second individual based on determining that a likelihood of the second individual taking the self-photograph at the location exceeds a predetermined threshold.

19. The computer program product of claim 11, wherein the action includes at least modifying the background image to obfuscate identification associated with the location prior to the image file being shared on the social media website.

20. A computer-implemented method comprising:
   detecting automatically that an image file is to be posted on a social media web site, the image file containing at least an image of a first individual with a background image depicting a location determined to be unsafe;
   determining a risk level associated with the location in the image file containing the image of the first individual with the location's background, wherein the risk level is determined at least based on detecting whether a false sense of risk is created in the image file by simulating the background;
   based on the risk level, automatically activating an action to deter at least a second individual from taking a photograph of the second individual at the location.

\* \* \* \* \*